Dec. 9, 1969  E. MEIER  3,482,661

AUTOMATIC SELF-ADJUSTING MECHANISM FOR DISK BRAKES

Filed Sept. 18, 1967  2 Sheets-Sheet 1

INVENTOR.
ERNST MEIER

BY Karl F. Ross

ATTORNEY

Dec. 9, 1969          E. MEIER          3,482,661

AUTOMATIC SELF-ADJUSTING MECHANISM FOR DISK BRAKES

Filed Sept. 18, 1967          2 Sheets-Sheet 2

INVENTOR.
ERNST MEIER
BY
Karl F. Ross
ATTORNEY

United States Patent Office 3,482,661
Patented Dec. 9, 1969

3,482,661
AUTOMATIC SELF-ADJUSTING MECHANISM FOR DISK BRAKES
Ernst Meier, Frankfurt am Main-Sindlingen, Germany, assignor to Alfred Teves G.m.b.H., Frankfurt am Main, Germany, a corporation of Germany
Filed Sept. 18, 1967, Ser. No. 668,515
Claims priority, application Germany, Sept. 16, 1966,
T 32,068
Int. Cl. F16d *65/58, 55/22*
U.S. Cl. 188—196                                       8 Claims

ABSTRACT OF THE DISCLOSURE

An automatically operable self-adjusting mechanism for compensating the rest position of a brakeshoe of a disk brake adapted to be actuated hydraulically and/or mechanically (e.g. via a Bowden cable), the mechanism including a crankshaft mounted in the brake housing or yoke and rotatable about an axis parallel to the brakeshoe and perpendicular to the direction of brakeshoe displacement toward and away from the disk while having an eccentric portion rotatably received in an eccentric cam, a torsion spring having its ends anchored to the eccentric cam and to the shaft and being under prestress for rotating the cam relatively to the shaft upon hydraulic advance of the brakeshoe beyond a predetermined brake "play" and/or entraining the eccentric cam with the crankshaft and maintaining it in a partly rotated position while restoring the crankshaft when the brake is mechanically actuated. A compressible dished-disk spring forms a resilient pressure member between the eccentric cam and the brakeshoe to establish the play.

---

My present invention relates to hydraulically and/or mechanically operable disk brakes and, more particularly, to an automatic self-adjusting mechanism therefor.

In general, a disk brake can be defined as a brake arrangement which, in contrast to radial-expansion and radial-contraction brakes in which the brakeshoes cooperate with drum surfaces whose generatrices are parallel to the axis of rotation of the rotatable member, have a disk with a pair of opposed braking faces centered on the axis of rotation of the disk and lying in planes generally transverse to this axis, the disks passing through a brake housing or yoke (which may reach around the periphery of the disk along a sector thereof) between a pair of wheel-brake cylinders and respective brakeshoes. The brakeshoes confronting the annular braking faces of the disk may have brake linings with high coefficient of sliding friction engageable with the annular braking faces of the disk and supported upon backing plates which are shifted toward and away from the disk by suitable actuating means. The actuating means chosen for this purpose depends, of course, upon the particular requirements. For example, disk brakes for automotive-vehicle systems have hitherto mounted the brake disk upon a wheel or its axle while the brake housing is relatively nonrotatable and is affixed to the axle housing or a portion of a vehicle chassis proximal to the wheel. When a stationary yoke is used, each of the brakeshoes may be provided with a respective actuator or else a single actuator may be employed while force-transmitting means (e.g., a lever linkage) acts upon the other brakeshoe. Alternatively, a "floating" yoke or housing may be employed in which a single actuator is disposed in one lobe of the yoke to urge its brakeshoe directly against the disk and transmit reaction force to the countermoving yoke which draws the other brakeshoe against the disk. More generally, a pair of actuators will be provided in the brake housing to urge the respective brakeshoes against the opposite faces of the disc.

Upon wear of the brake linings, however, the brake "play" (i.e., the normal stroke of the actuator, brakeshoe, etc. until the brake lining bears fully against the disk) tends to increase and, if not compensated by an adjustment of the rest position of the brakeshoe in the de-energized state of the system, will eventually result in nonuniform application of the brakeshoes on opposite side of the disk and uneven brake wear, in nonuniform brake operation between sets of wheel brakes, etc. Accordingly, it has already been proposed to provide self-adjusting devices which will readjust the rest positions of the brakeshoes upon their movement beyond the normal brake "play" and thus reset the actuating mechanism, which may be hydraulic or mechanical, for a successive brake operation. Such earlier devices may use ratchet-and-pawl systems in which a spindle is threaded into or out of a nut, friction-sleeves in telescoping arrangements or some other form of frictional bridge between an actuating member and a movable member in force-transmitting relationship with the brakeshoe or between the housing and a movable member of the actuating system. None of these arrangements have proved to be sufficiently precise for all purposes and are frequently characterized by a complexity which prevents their widespread use as well as by difficulty with respect to repair and replacement.

It is, therefore, the principal object of the present invention to provide an improved and relatively simply self-adjusting mechanism for use with hydraulically or mechanically actuated disk brakes.

A further object of this invention is to provide a self-adjusting mechanism for automatically compensating the wear of a brakeshoe of a disk brake whereby the tendency of the mechanism to malfunction, in exact adjustment and frictional wear is reduced.

These objects and others which will become apparent hereinafter are attainable in a disk-brake system having a brake housing, a brakeshoe shiftable with respect to the housing toward and away from a brake disk and a self-adjusting mechanism including a crankshaft journaled in the housing perpendicular to the direction of movement of the brakeshoe but parallel to the braking face of the disk and perpendicular to the actuating hydraulic cylinder, if any, the crankshaft having a cylindrical portion disposed eccentrically with respect to the axis of rotation of the crankshaft and forming a journal for an eccentric cam interposed between this eccentric portion of the crankshaft and the brakeshoe, while a prestressed spring bridges the crankshaft and the eccentric cam so as to urge the cam about the axis of the journal means in a sense tending to bring successive portions of progressively increasing radial width between the latter axis and the brakeshoe. This spring is advantageously a spiral or helical torque spring mounted upon the crankshaft and having one end anchored thereto while the other end of this torsion spring engages the cam to urge the crankshaft and cam into relative rotation in the sense indicated. To maintain a constant brake play, I provide between the hydraulically actuatable piston, which serves as an intervening force-transmitting member between the brakeshoe, and the eccentric cam an elastically deformable pressure disk which can be axially compressed by the restoring force through an axial stroke equal to the desired brake play, this disk remaining undeformed by the spring-generated adjusting force which drives the wedge-like but rotatable cam between the crankshaft and the compressible disk. To reset the piston and stress the torsion spring, the shaft upon which the eccentric cam is journaled may be rotated, e.g. via a lever, the lever and crankshaft forming a mechanical actuating means for the brake.

The above and other objects, features and advantages of the present invention will become more readily apparent from the following description, reference being made to the accompanying drawing in which.

Figure 1:
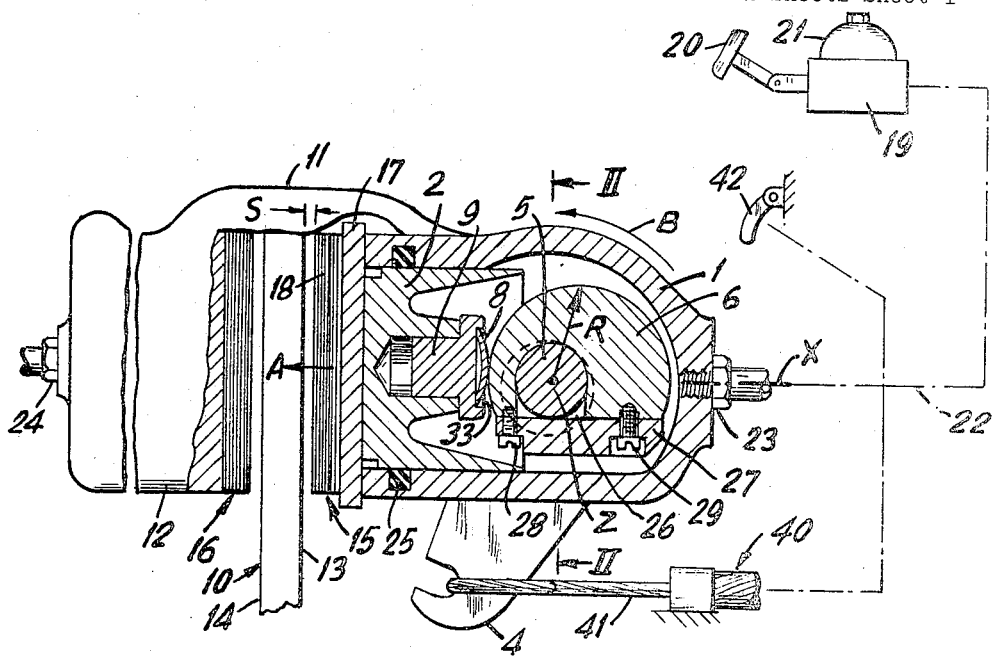
FIG. 1 is an axial cross-sectional view through one lobe of a disk-brake yoke showing a wheel-brake cylinder of an automative-vehicle brake system, some parts of the system being illustrated diagrammatically and others in stylized form.

Referring first to FIG. 1, it will be seen that the system of the present invention may comprise a brake disk 10 affixed to the wheels or axle of an automotive vehicle by conventional means and a brake yoke 11 whose lobes 1 and 12 flank the braking faces 13 and 14 of the disk. In this arrangement, the yoke 11 is secured to a part of the vehicle which is fixed with respect to the axis of rotation of the disk 10, this part preferably being the axle housing. A pair of brakeshoes 15 and 16 flank the disk 10 along sectors thereof and lie in respective planes parallel to the braking faces 13 and 14 of the disk and thus perpendicular to the axis thereof. Each brakeshoe 15 or 16 includes a backing plate 17 adapted to be urged by an actuating system in the direction of the disk (e.g. arrow A) and a lining 18 of a material with high frictional coefficient bonded to the backing plate.

In FIG. 1, the normal brake play S has been exaggerated for convenience of illustration and will be understood to increase with wear of the brake lining. The brake play is usually described in terms of the normal rest position of the brakeshoes and actuating assembly as illustrated in FIG. 1. The system of FIG. 1 can be operated as a hydraulic brake or a mechanical brake or both so that the operation of the self-adjusting mechanism will be described hereinafter with respect to both modes. It will be recognized, however, that the hydraulic means can be dispensed with when the the unit is to be actuated simply as a mechanical brake (in which case the mechanical actuator can act directly upon the brakeshoe instead of through the intermediary of a piston), while the mechanical means need not be employed when solely hydraulic operation is contemplated.

For hydraulic operation, the system includes the usual master cylinder 19 located at the footboard of the operator's position of the vehicle and adapted, upon depression of the brake pedal 20, to force hydraulic fluid under pressure from the brake-fluid reservoir 21 through a line 22 and an inlet fitting 23 or 24 into the respective wheel-brake cylinders formed in lobes 1 and 12. These cylinders have axes X which are perpendicular to the braking faces 13, 14 of the disk 10, parallel to its axis of rotation and in the direction of movement A of the brakeshoes 15, 16. Each cylinder (e.g. as illustrated for cylinder 1) is provided with a piston 2 which bears against the backing plate 17 of the brakeshoe and is slidable within the cylinder which has an annular seal 25 preventing escape of fluid from the system. Thus, when hydraulic fluid is introduced into the cylinder 1, the piston 2 is shifted to the left (arrow A) to take up the brake play S and then apply the brakeshoe 15 with the requisite braking force to the juxtaposed surface 13 of the disk 10.

The self-adjusting means for the purpose of hydraulic operation comprises a journal formed by a cylindrical member 5 positioned in the cylinder 1 and carrying a rotatable eccentric cam 6 which has a recess 26 permitting the cam to be mounted radially upon the cylindrical member 5 and to be rotatably held thereon with freedom of movement by a plate 27 and screws 28, 29.

A torsion spring 7 of helicoidal configuration is mounted upon the shaft 3 and has an end 30 inserted radially through a bore therein so as to be continuously entrained with the shaft 3. The other extremity 31 of the torsion spring 7 is bent parallel to the axis of rotation Y of the shaft 3, which is journaled in the housing 1, and projects into an axial bore 32 formed in the eccentric cam 6. The torsion spring 7 is tensioned upon its insertion so as to continuously urge the cam 6 to rotate in the direction of arrow B about the journal 5 relative to the shaft 3.

As can also be seen from FIG. 1, the cam 6 has a progressively increasing radial width R in the direction in which it is urged between its axis Z and the piston 2 by the spring 7. The piston 2 is provided with a pressure pin 9 having an axially open recess 33 in which an axially compressible disk 8 is located, the disk 8 acting as yieldable member compressible by the restoring force applied to the piston 2 to maintain the brake play S. Thus, as long as this play S can be discerned between the brakeshoe and the brake disk 10, the pressure disk 8 must be concerned to be in its compressed condition.

When hydraulic fluid is introduced into the cylinder 1, the piston 2 is urged to the left through an axial stroke equal to the brake play while the compressed disk 8 is decompressed but maintains frictional contact with the periphery of the eccentric cam 6. When the play S is greater than that established by the extent of compression of disk 8, however, such increase in play can be attributed to wear of the brakeshoe. Further movement of the piston 2 to the left thus lifts the pressure disk 8 from the eccentric cam 6 and permits this cam to swing in the direction of arrow B under the action of the pretensioned torsion spring 7 to again bring its periphery into contact with the disk 8 and thereby frictionally terminate further movement of the eccentric cam. Thus, the eccentric cam acts as a rotary wedge which is driven into the gap between the pressure disk 8 and the journal 5 by spring 7 and is then frictionally held in place in a self-locking arrangement, the "divergence" of the cam being selected such that the reaction force applied by the piston 2 to the cam does not rotate it in the opposite sense. When the hydraulic fluid supply to the cylinder 1 is relieved, the disk 10 drives the brakeshoes 15 and 16 away from the disk with a "restoring force" which suffices to compress pressure disk 8 and re-establish the desired brake play. The restoring force can also be produced by springs of the type conventionally used for this purpose. It will be understood that any brake play can be established merely by exchange of the disk 8. Further application of hydraulic pressure to the system will cause movement of the piston 2 within this play until additional brake wear increases it, whereupon the cam 6 will be advanced further in the direction of arrow B.

Figure 2:
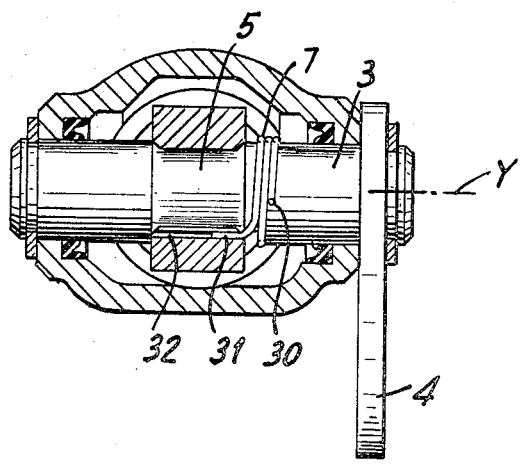
FIG. 2 is a cross-sectional view taken generally along the line II—II of FIG. 1.

When, independently of the hydraulic system, it is desired to provide means for mechanically operating the brake, the cylindrical journal 5 is formed integrally with the saft 3 as an eccentric whose axis Z is offset from the axis of rotation Y of the crankshaft 3. The crankshaft 3 is also provided with a lever 4 which can be shifted in the direction of arrow B via a Bowden cable 40 whose core wire 41 is connected to an actuating lever 42 at the driver's position at the vehicle. In this case, the mechanical brake actuator forms part of the emergency, parking or locking brake. Upon tensioning of the core wire 41, the crankshaft 3 is rotated in the direction of arrow B via lever 4 while the cam 6 merely bears frictionally against the disk 8 and is not rotated unless entrained by its torsion spring upon increase of the brake wear. The movement of axis Z to the left (FIG. 1) suffices to shift the piston 2 in the direction of disk 10. When, however, excessive brake play has developed, the spring 7 (FIG. 2) entrains the cam 6 to increase the radial width W thereof between the cylindrical portion 5 and the pressure plate 8 when the lever 4 is released.

Figure 3:
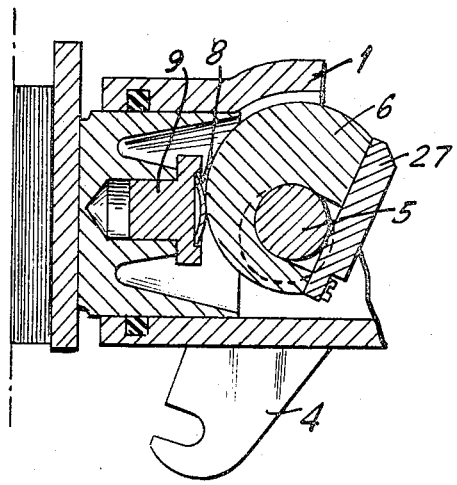
FIG. 3 is a fragmentary view similar to FIG. 1 showing the operating parts in another position when the system is hydraulically actuated.
Figure 4:
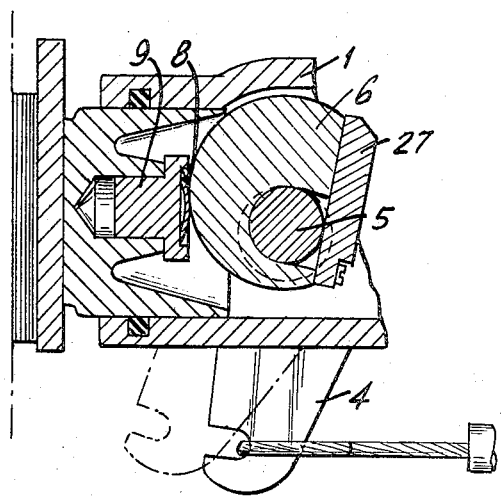
FIG. 4 is a view similar to FIG. 3 showing the brake arrangement in another operative position for mechanical operation.

In FIG. 3, I show the position of the eccentric 6 after it has been advanced with respect to the pressure plate 8 and before the restoring force has compressed the latter. In this position member 5 remains stationary and the brake play is re-established by compression of disk 8. FIG. 4 represents an exaggerated situation in which the cam 6 is illustrated as having advanced beyond the extent indicated in FIG. 3 and mechanical actuation of the brake has occurred. Here plate 8 is in its compressed condition.

Not only does the arrangement described and illustrated afford simplicity of construction, but it also permits the assembly of a self-adjusting mechanism without concern as to narrow tolerances. When the lever 4 is removed, the assembly can be reset merely by rotating shaft 3 (which need not be a crankshaft) in the clockwise sense (FIG. 1) until the reverse tension of the spring suffices to entrain the eccentric cam 6 in this direction. After the brakeshoes have been changed, it is merely necessary to rotate the shaft 3 until the original pretension of the spring 7 is restored.

The invention described and illustrated is believed to admit of many modifications within the ability of persons skilled in the art.

I claim:

1. In a disk brake having a brake disk, a brake housing flanking said disk, at least one brakeshoe confronting said disk and displaceable toward and away from a braking face thereof, and actuating means for shifting said brakeshoe relatively to said disk and said housing, the improvement which comprises an automatic adjusting device for reestablishing a rest position of said brakeshoe upon wear thereof to maintain a substantially constant brake play, said device including:

a shaft journaled in said housing and having an axis extending parallel to said brakeshoe and transversely to the direction of the displacement thereof;

an eccentric cam rotatably mounted on said shaft and formed with an arcuate zone of progressively increasing radial width interposable between said axis and said brakeshoe upon rotation of said cam in one sense about said axis; and prestressed spring means acting upon said cam and connecting said cam with said shaft and tending to urge said cam in said one sense upon development of excessive brake play with wear of said brakeshoe.

2. The improvement defined in claim 1 wherein said actuating means includes a fluid-responsive piston mounted in said housing and bearing upon said brakeshoe while being shiftable therewith, said eccentric cam bearing frictionally upon said piston and being frictionally retarded from further rotation thereby upon advance of said cam in said one sense to compensate increased brake play.

3. In a disk brake having a brake disk, a brake housing flanking said disk, at least one brakeshoe confronting said disk and displaceable toward and away from a braking face thereof, and actuating means for shifting said brakeshoe relatively to said disk and said housing, the improvement which comprises an automatic adjusting device for reestablishing a rest position of said brakeshoe upon wear thereof to maintain a substantially constant brake play, said device including:

journal means having an axis extending parallel to said brakeshoe and transversely to the direction of the displacement thereof;

an eccentric cam rotatably mounted on said journal means and formed with an arcuate zone of progressively increasing radial width interposable between said axis and said brakeshoe upon rotation of said cam in one sense about said axis; and prestressed spring means acting upon said cam and tending to urge said cam in said one sense upon development of excessive brake play with wear of said brakeshoe, said actuating means including a fluid-responsive piston mounted in said housing and bearing upon said brakeshoe while being shiftable therewith, said eccentric cam bearing frictionally upon said piston and being frictionally retarded from further rotation thereby upon advance of said cam in said one sense to compensate increased brake play, said spring means includes a torsion spring centered upon said axis and anchored to said cam and to said journal means.

4. The improvement defined in claim 3 wherein said journal means includes a cylindrical shaft mounted in said housing means and carrying said cam, said torsion spring being mounted upon said shaft.

5. The improvement defined in claim 4 wherein said shaft is a crankshaft rotatably journaled in said housing for rotational movement about an axis parallel to but offset from the first-mentioned axis and having an eccentric portion carrying said cam and defining said first-mentioned axis, said actuating means including means for rotating said shaft in said housing.

6. The improvement defined in claim 4, further comprising resiliently compressible means interposed between said cam and said piston and compressible upon the application of a restoring force to said brakeshoe and fluid-pressure relief of said piston to re-establish the original brake play.

7. The improvement defined in claim 6 wherein said resiliently compressible means includes means forming an axially open recess confronting the periphery of said cam, and a compressible pressure disk seated in said recess and engageable frictionally with said periphery of said cam, said disk being compressible by the restoring force applied by said brakeshoe in the direction of movement thereof away from the disk but being incompressible by wedging action of said cam upon rotary entrainment by said spring.

8. The improvement defined in claim 4, further comprising means for rotating said shaft to stress and destress said spring.

References Cited

UNITED STATES PATENTS 3,372,775   3/1968   Beller et al.
3,378,109   4/1968   Bauman.

DUANE A. REGER, Primary Examiner

U.S. Cl. X.R.

188—73, 106